United States Patent
Zadok et al.

(10) Patent No.: US 11,221,209 B2
(45) Date of Patent: Jan. 11, 2022

(54) DISTRIBUTED FIBER OPTIC SENSING USING GUIDED ACOUSTIC MODES

(71) Applicant: BAR-ILAN UNIVERSITY, Ramat Gan (IL)

(72) Inventors: Avinoam Zadok, Givat Shmuel (IL); Yair Antman, Kfar Saba (IL); Hilel Hagai Diamandi, Givat Shmuel (IL); Yosef Menachem London, Givat Shmuel (IL); Eyal Preter, Givat Ela (IL); Gil Bashan, Petah Tikva (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 42 days.

(21) Appl. No.: 16/603,426

(22) PCT Filed: Apr. 9, 2018

(86) PCT No.: PCT/IL2018/050411
§ 371 (c)(1),
(2) Date: Oct. 7, 2019

(87) PCT Pub. No.: WO2018/193440
PCT Pub. Date: Oct. 25, 2018

(65) Prior Publication Data
US 2020/0149878 A1    May 14, 2020

(30) Foreign Application Priority Data

Apr. 20, 2017    (IL) .......................................... 251841

(51) Int. Cl.
*G01B 11/16*    (2006.01)
*G02B 6/122*    (2006.01)

(52) U.S. Cl.
CPC ............ *G01B 11/16* (2013.01); *G02B 6/1225* (2013.01)

(58) Field of Classification Search
CPC .. G01B 11/16; G02B 6/1225; G02B 6/03694; G02B 6/122; G02F 1/125; G02F 1/025;
(Continued)

(56) References Cited

U.S. PATENT DOCUMENTS 7,991,287 B2 * 8/2011 Bickham .................. H04N 7/22
                                                    398/66
8,600,200 B1 * 12/2013 Rakich .................. G02F 1/0126
                                                    385/7

(Continued)

OTHER PUBLICATIONS

Hayashi et al., Experimental study on depolarized GAWBS spectrum for optomechanical sensing of liquids outside standard fibers, The University of Tokyo, Feb. 6, 2017 (6 pages).
(Continued)

*Primary Examiner* — Mohamed K Amara
(74) *Attorney, Agent, or Firm* — Roach, Brown, McCarthy & Gruber, P.C.; Kevin D. McCarthy (57) ABSTRACT

A method for sensing a parameter of an environment surrounding an optical fiber comprises performing a distributed analysis of one or more guided acoustic wave Brillouin scattering (GAWBS) processes taking place therein. This distributed analysis may be performed by spatially mapping a spectral linewidth of a GAWBS coefficient along the optical fiber.

17 Claims, 5 Drawing Sheets

(58) Field of Classification Search
CPC ........ G02F 1/211; G02F 1/3519; G02F 1/353;
G02F 2201/06; G02F 1/3515; G02F
1/3532; G02F 1/3534; G02F 1/3536;
G02F 1/3544; G02F 1/365; G02F 1/37;
G02F 1/39; G02F 1/392; G02F 1/395;
H04B 10/2537; H04B 10/2575; H01S
3/302; H01S 3/06754; H01S 2301/02;
H01S 3/30; H01S 3/06741; H01S 3/1305;
G01J 2009/0226; G01J 9/02; G01J
5/0821; E21B 47/135; E21B 47/007;
E21B 47/06; E21B 47/09; E21B 47/07;
G01D 5/35364; G01D 5/35303; G01K
11/322; G01K 11/32; G01K 11/3206;
G01M 11/085; B23K 26/0604; B82Y
20/00; B82Y 30/00
See application file for complete search history.

(56) References Cited

U.S. PATENT DOCUMENTS

| | | | |
|---|---|---|---|
| 9,806,805 B2* | 10/2017 | Dominguez Lopez | ...................... H04B 10/071 |
| 9,874,519 B2* | 1/2018 | Gruner-Nielsen | .......................... G02B 6/02252 |
| 9,964,420 B2* | 5/2018 | Gruner-Nielsen | .......................... G02B 6/03627 |
| 2007/0297807 A1* | 12/2007 | Chen | .................. H04B 10/2537 398/158 |
| 2008/0068586 A1* | 3/2008 | Kishida | ................... G01L 1/242 356/32 |
| 2010/0014071 A1* | 1/2010 | Hartog | ............... G01D 5/35361 356/73.1 |
| 2015/0036210 A1* | 2/2015 | Asobe | ................... G02F 1/3544 359/341.3 |
| 2021/0096297 A1* | 4/2021 | Hasegawa | .............. G02B 6/036 |

OTHER PUBLICATIONS

Klimov et al., On-Chip silicon waveguide bragg grating photonic temperature sensor, National Institute of Standards and Technology, Gaithersburg, Dec. 31, 2015 (4 pages).
Tanaka et al., Tensile-Strain Coefficient of Resonance Frequency of depolarized guided acoustic-wave brillouin scattering, Yosuke Tanaka & Kazuhiko Ogusum Jul. 7, 1999 (3 pages).
Antman et al., Optomechanical sensing of liquids outside standard fibers using forward stimulated Brillouin scattering, Optica 3, 510-516 (2016) (7 pages).
Shelby et al., Guided acoustic-wave Brillouin scattering, Phys. Rev. B 31, 5244-5252 (1985) (abstiact only).
Thurston, Elastic waves in rods and optical fibers, J. sound and vibration 159, 441-467 (1992) (abstract only).
International Search Report for PCT/IL2018/050411, dated Jul. 15, 2018 (3 pages).
Written Opinion of the International Searching Authority for PCT/IL2018/050411, dated Jul. 15, 2018 (5 pages).
Thurston, Elastic waves in rods and optical fibers, J. sound and vibration 159, 441-467 (1992) (27 pages).
Shelby et al., Guided acoustic-wave Brillouin scattering, Phys. Rev. B 31, 5244-5252 (1985) (9 pages).

* cited by examiner

DISTRIBUTED FIBER OPTIC SENSING USING GUIDED ACOUSTIC MODES

FIELD OF THE INVENTION

The present invention relates to the use of optical fibers as sensors for a variety of applications.

BACKGROUND OF THE INVENTION

Optical fibers were invented primarily as means for supporting broadband telecommunication. At the same time, however, optical fibers also constitute an exceptional sensing platform. They allow for remote-access measurements, up to distances of hundreds of km; they can be embedded within a structure with little effect on functionality; they are immune to electromagnetic interference; and they may be employed in hazardous environments where the application of electrical currents is prohibited. In conjunction with proper analysis setups, the propagation of light in the fiber can be made sensitive to a variety of environmental parameters of interest, such as temperature, humidity, mechanical deformation and stress, electric and magnetic fields, sound and vibration, the presence and concentration of chemical and biological reagents and more. The annual market for optical fiber sensors is estimated as 1.5 Billion USD.

The implementation of fiber-optic sensors, however, faces a fundamental difficulty. Standard fibers guide light at an inner core, with a typical diameter between 8-10 µm. The physical diameter of the entire silica fiber is much larger: the standard diameter of its cladding is 125 µm. Since standard fibers are designed for telecommunication applications, every effort is made to guarantee that no light escapes the inner core and reaches outside the cladding. At the same time, direct optical measurements such as the analysis of absorption, refraction or scattering, mandate a spatial overlap between light and the substance being tested. Hence, all fiber sensors known to-date fall within one of the following categories:

1. Sensors that measure conditions that prevail within the inner core of a standard fiber, such as temperature, electromagnetic field or mechanical strain.

Sensors within this category cannot provide information about the media that surround the cladding of the fiber. Therefore, all chemical and biological sensors based on optical fibers fall under the remaining categories:

2. Sensors that employ non-standard fiber cross-sections, such as photonic-crystal fibers or micro-structured fibers, which include sizable air holes. A substance under test may, in principle, infiltrate such fibers and come in overlap with guided light.
3. Sensors that employ non-standard materials that react with the environment, such as bio-polymers or even spider-silk.
4. Sensors that involve considerable structural modification of a standard silica fiber, in the form of gratings inscription, etching, tapering, polishing, application of specialty coating layers, formation of inline cavities, processing of facets etc.

While optical fiber sensors of categories 2 through 4 could be elaborate, sensitive and specific, their non-standard designs remain a considerable drawback. The art has so far failed to provide an efficient solution to the optical sensing of substances, using standard and unmodified fibers, because taking an optical measurement of a substance that "we do not see" appears to be a contradictory proposition.

In a recent publication by few of the inventors hereof (Yair Antman, Alex Clain, Yosef London, and Avi Zadok, "Optomechanical sensing of liquids outside standard fibers using forward stimulated Brillouin scattering," *Optica* 3, 510-516 (2016)), a first optical fiber sensor that is able to measure the mechanical impedance of liquid substances outside the cladding of standard, unmodified fibers was proposed and demonstrated. The solution path involves "listening" to the medium outside the fiber, where it is not possible to employ the optical fiber to "see". It is based on the nonlinear optical interaction of *Guided Acoustic Waves Brillouin Scattering*, or GAWBS, which is described, for instance in R. M. Shelby, M. D. Levenson, and P. W. Bayer, "Guided acoustic-wave Brillouin scattering," *Phys. Rev. B* 31, 5244-5252 (1985). The guiding of light aside, optical fibers are nearly-uniform rods of silica. As such, they support a broad portfolio of guided acoustic modes. Under most circumstances, the propagation of light and sound along an optical fiber may be regarded as two separate and unrelated phenomena. Yet, the two might be coupled. The propagation of light at the inner core of a standard fiber may stimulate the oscillation of guided acoustic modes, through the mechanism of electrostriction. Further, the acoustic oscillations induce perturbations to the dielectric constant of the fiber medium. These perturbations, in turn, affect the propagation of light waves. The term GAWBS refers to the stimulation of guided sound by guided light and the accompanying scattering of guided light by guided sound. The phenomenon is used herein in a new class of fiber-optic sensors.

Figure 1:
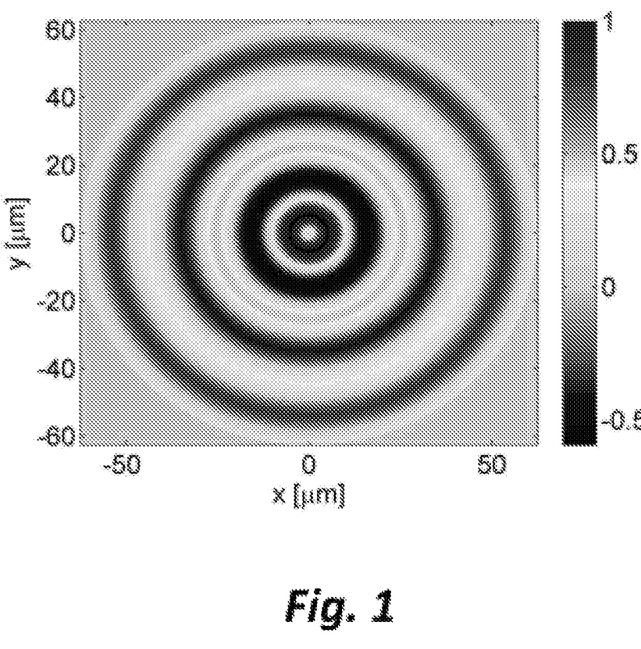
FIG. 1 shows a normalized transverse profile of material displacement of a radial acoustic mode that is guided in a standard fiber.
Figure 2:
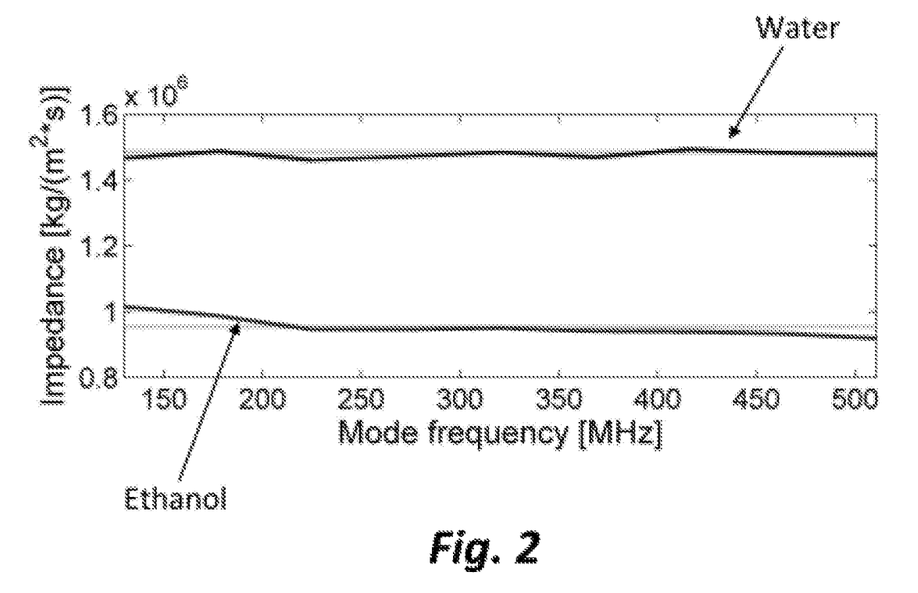
FIG. 2 (solid lines), shows the measured mechanical impedances of water and ethanol outside the cladding of a standard fiber, as a function of the resonance frequency of guided acoustic modes. Dashed lines show corresponding reference values.
Figure 3:
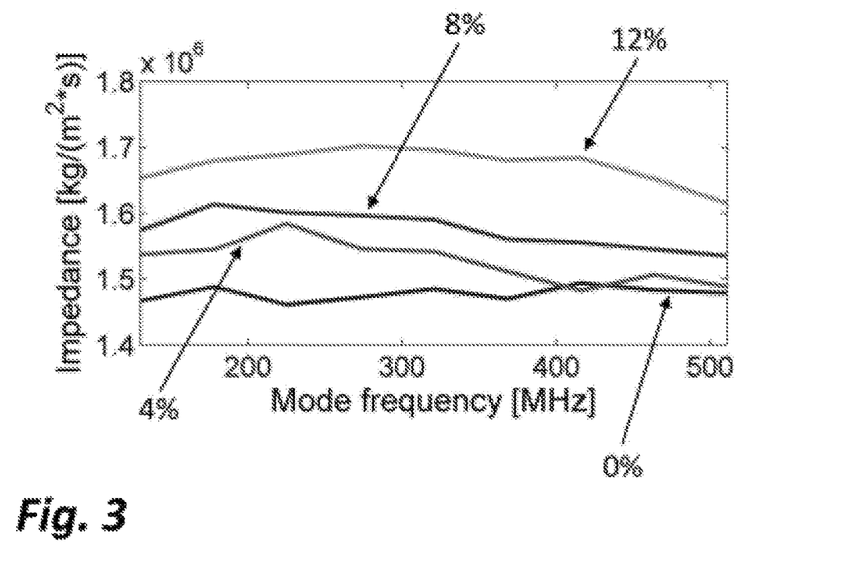
FIG. 3 shows the measured mechanical impedances of aqueous solutions containing different weight ratios of added salt, outside the cladding of a standard fiber, as a function of the resonance frequency of acoustic modes.

FIG. 1 shows a normalized transverse profile of material displacement of a radial acoustic mode that is guided in a standard fiber (for a generic reference for the profiles of acoustic modes see R. N. Thurston, "Elastic waves in rods and optical fibers," *J. sound and vibration* 159, 441-467 (1992)). Guided acoustic modes of standard fibers may be effectively stimulated at frequencies that range between tens of MHz up to the order of 1 GHz. Guided acoustic modes provide an added value which cannot be obtained by guided light: Their transverse profiles are not confined to the inner core. In fact, they extend all the way to the outer boundary of the fiber cladding. Guided sound waves therefore "probe" the surrounding media. More specifically, the resonant linewidth of GAWBS due to each acoustic mode is affected by dissipation to the surrounding medium. The linewidth is deterministically related to the coefficient of acoustic reflectivity at the cladding boundary, which is in turn given by the mechanical impedance of the outside environment. As described in the abovementioned Yair Antman et al., (*Optica* 3, 510-516 (2016)) article, the inventors have successfully used light pulses to stimulate guided acoustic modes and observed the spectral linewidths of their oscillations. Based on measured spectra, the mechanical impedance of water and ethanol was recovered with better than 1% accuracy (FIG. 2). Further, the measurements successfully distinguished between aqueous solutions with different levels of salinity (FIG. 3).

This first demonstration of GAWBS-based sensing has been a conceptual breakthrough, yet it suffers from one major limitation: it only provides a single impedance reading, which is averaged over the entire length of a fiber under test. Such so-called point sensors are of limited practical value. Optical sensors that involve structural modification of a standard fiber, (for example: fiber Bragg gratings), may achieve equivalent chemical sensing with a much simpler setup. The art has so far failed to provide means to extend the GAWBS sensing technique to distributed analysis: the spatially-continuous measurement of mechanical impedance outside the cladding along kilometers of standard fiber, wherein every fiber segment serves as an independent sensing node. As will be apparent to the skilled person, solving this problem would be of great practical importance in many applications, such as oil and gas plants, pipeline integrity, smart grids, oceanography, chemical industries, desalination of water etc.

Three classes of distributed fiber-optic sensors have been known for over 30 years. All are based on physical mechanisms of scattering in the backwards direction along the fiber:

1. Rayleigh scattering, which stems from sub-wavelength inhomogeneity in the silica matrix. Rayleigh scattering is a linear process, and it is successfully employed in the measurement of temperature, static strain, sound and vibration
2. Raman scattering, which is due to the coupling between guided light and molecular vibration levels of the fiber medium. This nonlinear process is employed in temperature measurements.
3. Backwards Brillouin scattering, which involves the coupling between guided light and hyper-sonic sound waves. This process is nonlinear as well, and it is used in the measurements of temperature, strain, sound and vibration.

All three processes involve scattering that takes place at the inner core only. They cannot provide information regarding media outside the cladding. In particular, it should be noted that backwards Brillouin scattering processes, which have found use in prior art fiber-sensors, involve longitudinal sound waves at frequencies of 10-11 GHz that are confined to the fiber core just as well as guided light. These sound waves are stimulated by a pair of optical fields that must be counter-propagating in the standard fiber. GAWBS, on the other hand, is inherently a forward-scattering process. Hence techniques used for in prior art fiber sensors towards spatially-resolving scattering events are inapplicable to GAWBS analysis.

Objectives and Unmet Needs

The unmet need that is answered by this patent application is the distributed analysis of mechanical impedance outside the cladding of a standard unmodified fiber. In answering the need, we propose an entirely new class of distributed fiber-optic sensors, which is based on GAWBS. The sensor is fundamentally different from all previous categories, as it is able to spatially-resolve a forward-scattering process.

SUMMARY OF THE INVENTION

In one aspect, the invention is directed to a method for sensing a parameter of an environment surrounding an optical fiber, comprising performing a distributed analysis of one or more guided acoustic wave Brillouin scattering (GAWBS) processes taking place therein.

According to one embodiment of the invention, the GAWBS process involves the stimulation of one or more radial, torsional, or radial-torsional guided acoustic modes of an optical fiber. According to another embodiment of the invention, the resonance frequency of a GAWBS process is mapped along an optical fiber and according to a further embodiment of the invention the spectral linewidth of a GAWBS process is mapped along an optical fiber.

As will be apparent to the skilled person, the GAWBS process implemented according to the method of the invention can be used to estimate a variety of parameters, including, but not limited to the acoustic reflectivity at the outer boundary of the fiber cladding, the acoustic reflectivity at the outer boundary of a layer or layers of coating surrounding the fiber cladding, the mechanical impedance of media outside the fiber cladding, and the mechanical impedance of media outside a layer or layers of coating that are applied to the fiber cladding.

According to an embodiment of the invention the sensed parameter is used to classify liquids under test, which may include (but are not limited to) water, aqueous solutions, alcohols, and oils.

The skilled person will appreciate that it is sometimes desirable to modify the outer surfaces of the fiber cladding or coating to attach a chemical or biological reagent of interest, and in one embodiment of the invention the attachment of said reagent is monitored through modifications to GAWBS processes.

The GAWBS distributed analysis can be performed in various ways, for instance, using an optical fiber selected from among standard single-mode, non-standard single-mode, few-mode, multi-core, multi-mode, photonic-crystal and micro-structured fibers, or using a photonic waveguide that is not an optical fiber, for instance an integrated photonic circuit in silicon, glass, or other substrate.

According to one embodiment of the invention GAWBS and backwards stimulated Brillouin scattering are used together.

In yet another embodiment of the invention a pair of optical tones is used to stimulate guided acoustic waves in an optical fiber. Without derogating from the generality of the above, the invention can utilize, inter alia, one or more of the following procedures:

a. The two tones are launched from an input end of an optical fiber;
b. A first tone of the two tones is launched from an input end of the optical fiber, and a second tone is generated through the propagation of said first tone via spontaneous scattering from guided acoustic waves;
c. An amplitude of the two tones is modulated by one or more, periodic or aperiodic pulses;
d. The power levels of one tone or both tones change in propagation along the optical fiber due to GAWBS;
e. An optical power of one tone or both tones is spatially mapped along the optical fiber;
f. The optical power of one tone or both tones is spatially mapped based on measurements of Rayleigh back-scattering from an optical fiber;
g. The optical power of one tone or both tones is spatially mapped based on measurements of point reflections;
h. The optical power of each of one tone or both tones is spatially mapped based on measurements of reflections from a series of fiber Bragg gratings;
i. The Rayleigh back-scattering contributions of the two tones are separately detected;
j. The Rayleigh back-scattering contributions of the two tones are separated based on frequency-selective stimulated Brillouin scattering processes in the optical fiber;
k. The Rayleigh back-scattering contributions of the two tones are separated through mixing with a local oscillator;
l. The Rayleigh back-scattering contributions of the two tones are jointly processed following detection, using radio-frequency mixing, filtering and processing;

m. The two tones stimulate guided acoustic waves, which are measured in turn through their interaction with a third optical wave that is launched from either end of the optical fiber.

As will be easily appreciated by the man of the art, the method of the invention finds useful applications in a variety of field, for example:

a. Monitoring and analysis of oil and gas wells
b. Monitoring of pipeline integrity
c. Monitoring of high-power electricity cables
d. Structural health monitoring
e. Oceanography
f. Monitoring of water desalination processes
g. Monitoring of chemical or petro-chemical industry processes
h. Monitoring hazardous materials
i. Monitoring of production processes in the food and beverage industry.

Also encompassed by the invention is a sensor for sensing a parameter of an environment surrounding an optical fiber, comprising circuitry adapted to perform a distributed analysis of one or more guided acoustic wave Brillouin scattering (GAWBS) processes taking place in said optical fiber.

A sensor according to one embodiment of the invention comprises circuitry adapted to stimulate and/or monitor one or more modes selected from radial, torsional, or radial-torsional guided acoustic modes of an optical fiber.

DETAILED DESCRIPTION OF THE INVENTION

For the sake of clarity, before providing the detailed description of the invention it should be clarified that the backwards Brillouin scattering processes referred to above, which have found use in fiber-sensors to-date, are fundamentally different from the GAWBS processes which are the subject of this invention. As explained, present-day Brillouin sensors involve longitudinal sound waves at frequencies of 10-11 GHz, which are confined to the fiber core just as well as guided light. These sound waves are stimulated by a pair of optical fields that must be counter-propagating in the standard fiber. GAWBS, in contrast, involves the stimulation of transverse sound waves at frequencies that are lower by 1-2 orders of magnitude, and the profiles of the acoustic waves extend across the entire cladding. Further, the GAWBS involves the stimulation of sound waves by a pair of co-propagating optical fields. The latter distinction, between the directions of propagation of optical fields that stimulate the sound waves, is fundamental to the difference between the sensors of the present invention and prior art distributed sensors. Since all prior art distributed sensors, of all three classes listed above, involve back-scatter, they can simply identify the location of a scattering event based on time-of-flight measurements. GAWBS, on the other hand, is inherently a forward-scattering process hence direct time-of-flight analysis of GAWBS is inapplicable. The extension of GAWBS-based sensors of mechanical impedance towards distributed analysis has been held back by the difficulty of spatially-resolving a forward-scattering process.

Having clarified this critical and central characteristic of the invention, which basically differs from sensors known in the art, the skilled person will be easily able to appreciate the invention from the following detailed description thereof.

Principle of Operation

Consider a pulse amplitude envelope of duration r at the input of a fiber under test. The pulse envelope modulates two spectral incident optical field components $E_{1,2}$, of optical frequencies $\omega_0 \pm \frac{1}{2}\Omega$, respectively. Here $\omega_0$ is a central optical frequency, and $\Omega$ is a radio-frequency variable which is on the order of the resonance frequency $\omega_0$ of GAWBS process which involves a specific acoustic mode of interest. The pulse comprised of the two fields propagates along the fiber under test in the positive z direction. We denote the optical power of the two field components as $P_{1,2}(z)$, respectively.

The combination of the two field components stimulates the oscillations of a guided acoustic mode. The stimulation is associated with an exchange of power between the two fields. The evolution of the two power levels is determined by the following differential equations, which include the effects of GAWBS and linear losses along the fiber:

$$\frac{dP_1}{dz} = -\alpha P_1 - \gamma(\Omega, z) P_1 P_2; \qquad (1)$$

-continued $$\frac{dP_2}{dz} = -\alpha P_2 + \gamma(\Omega, z) P_1 P_2$$

The equations suggest that the higher-frequency field component loses power to the lower-frequency one. In addition, both waves are subject to linear losses with a coefficient $\alpha$, in units of km$^{-1}$. The parameter $\gamma(\Omega,z)$ in Equations (1) is the GAWBS coefficient of the particular acoustic mode, in units of [W×km]$^{-1}$. It is maximal when $\Omega \approx \Omega_0$ at a certain location. The distributed analysis of mechanical impedance outside the fiber cladding mandates the mapping of $\gamma(\Omega,z)$. The spectral linewidth of $\gamma(\Omega,z)$ is of particular significance: it is the quantity which is directly related to the mechanical impedance of surrounding media.

Equations (1) show the following: mapping the evolution of the two power levels along the fiber, $P_{1,2}(z)$, allows for the recovering $\gamma(\Omega,z)$ from local increments. Since the value of $\alpha$ is known or may be readily calibrated with standard optical time-domain reflectometry, we obtain:

$$\gamma(\Omega, z) = \frac{\frac{d}{dz}(P_2 - P_1) + \alpha(P_2 - P_1)}{P_1 P_2}; \quad (2)$$

Since the power of the two optical waves in each position along the fiber is not directly available and cannot be deduced from measurements of power levels at the remote output end of the fiber under test, we observe the Rayleigh back-scatter of both optical waves. The power of Rayleigh back-scatter from each of the two waves, when the pulse envelope is centered at some point z, is denoted as $P_{1,2}^{(R)}(z)$. The collected Rayleigh back-scatter powers are a certain fraction f of the respective incident power $P_{1,2}(z)$:

$$P_{1,2}^{(R)} = f(\tau, \omega_0) \exp(-\alpha z) P_{1,2}. \quad (3)$$

The additional factor $\exp(-\alpha z)$ corresponds to linear losses from the point of back-scatter towards the input end, where measurements are taken. The fraction f scales with the pulse duration $\tau$ in a deterministic manner, however it is a stochastic function of the central optical frequency $\omega_0$. The collected back-scatter power at each instance corresponds to the superposition of a large number of fundamental reflection contributions. These contributions add up coherently, and their phasor sum cannot be predicted. Hence the acquisition of a single pair of traces $P_{1,2}^{(R)}(z)$ does not provide an accurate representation of $P_{1,2}(z)$.

To work around this difficulty, we repeat the experiment over a large number of different optical carrier frequencies $\omega_0$, and take the ensemble average of Rayleigh back-scatter traces:

$$\langle P_{1,2}^{(R)} \rangle_{107} = \langle f(\tau, \omega_0) \rangle_{107} \exp(-\alpha z) P_{1,2}. \quad (4)$$

Figure 4:
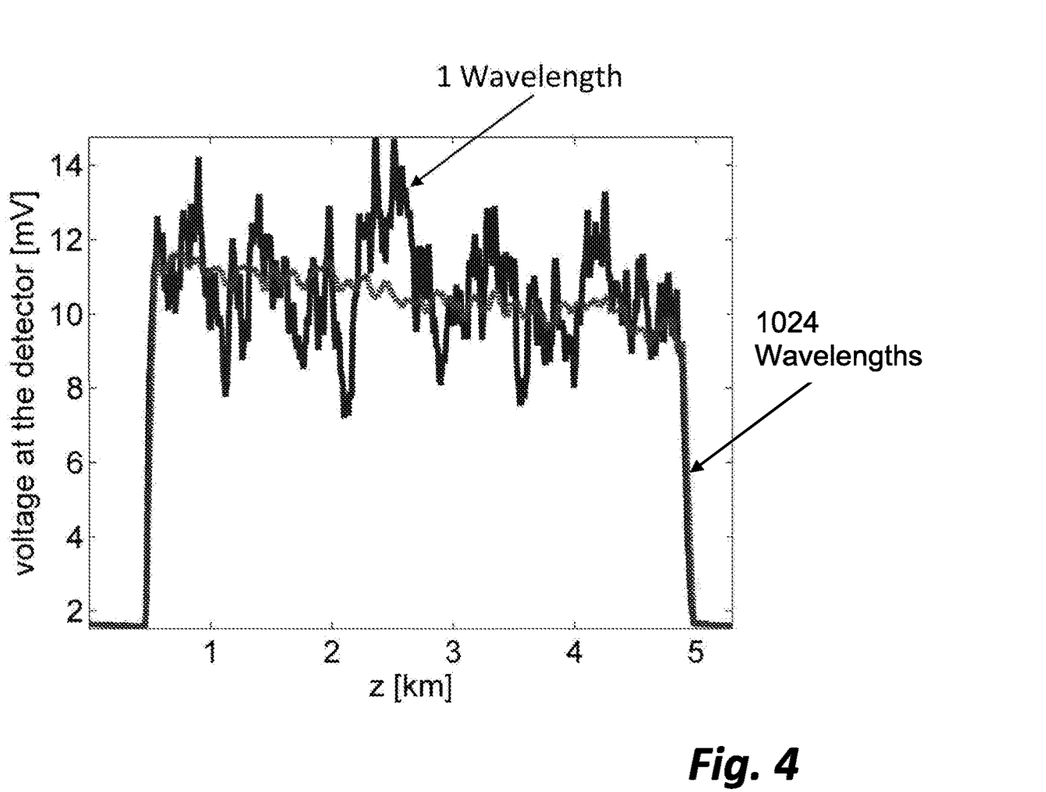
FIG. 4 shows examples of the detected waveform of Rayleigh back-scatter, as a function of position along a fiber under test, including (as indicated by the arrows) the results of a single measurement, taken with a coherent light source, and results following averaging over 1,024 traces, each taken with a coherent source of a different optical frequency.

The notation $\langle \rangle_{107}$ represents averaging over many different optical carrier frequencies, which span a spectral range of few nm. The averaged fraction $\langle f(\tau, \omega_0) \rangle_\omega$ is (ideally) a fixed factor which is independent of both z and $\Omega$. FIG. 4 shows examples of the collected Rayleigh back-scatter, with and without averaging over $\omega_0$, as a function of position along a fiber under test. The figure shows (as indicated by the arrows) results of a single measurement, taken with a coherent light source, and results following averaging over 1,024 traces, each taken with a coherent source of a different optical frequency. Fluctuations in the collected power are much reduced. The averaged trace provides a better estimate of the local optical power as a function of position.

Based on the above, the averaged Rayleigh back-scatter traces is used in the reconstruction of the relative local GAWBS coefficient:

$$\gamma \%(\Omega, z) \approx \frac{\frac{d}{dz}(\langle P_2^{(R)} - P_1^{(R)} \rangle_\omega) + \alpha \langle P_2^{(R)} - P_1^{(R)} \rangle_\omega}{\langle P_1^{(R)} \rangle_\omega \langle P_2^{(R)} \rangle_\omega \exp(\alpha z)}; \quad (5)$$

In order to be able to perform measurements according to the invention a further step must be taken, because the direct detection of the Rayleigh back-scatter of the two pulsed waves, without any additional measures, would only provide a sum: $P_1^{(R)}(z) + P_2^{(R)}(z)$. Hence some means of separating between the two traces is necessary, and several solutions can be provided by the skilled person. For the purpose of this illustration a selective Brillouin amplification along a second section of fiber is used. To that end, an auxiliary Brillouin pump wave is drawn from the same light source that serves for generating $E_{1,2}$. The frequency of that pump is adjusted to either $\omega_0 + \frac{1}{2}\Omega + \Omega_B$ or $\omega_0 - \frac{1}{2}\Omega + \Omega_B$, where $\Omega_B \sim 11$ GHz is the Brillouin frequency shift of the Brillouin amplifying fiber section. The former choice amplifies only $P_1^{(R)}(z)$, whereas the latter provides gain to $P_2^{(R)}(z)$ only. It should be emphasized that, as said, Brillouin amplification is not the only possible solution to distinguish between $P_{1,2}^{(R)}(z)$.

The experimental procedure is repeated over multiple choices of $\Omega$, until a map of $\gamma\%(\Omega, z)$ is obtained. The full-width at half maximum of the GAWBS spectrum in each position $\Gamma(z)$ is then identified. The acoustic reflectivity coefficient at the interface between the fiber cladding and the surrounding medium is found based on the retrieved linewidth:

$$r(z) = \exp\{-[\Gamma(z) - \Gamma_0]t_0\}. \quad (6)$$

Here $t_0$ is the acoustic propagation delay from the fiber axis to the cladding boundary and back. Its value in standard fibers of 125 μm diameter is about 20.83 ns. $\Gamma_0$ is the inherent linewidth which stems from acoustic dissipation in silica, ellipticity of the fiber cladding and diameter inhomogeneity. For liquid environments $\Gamma_0 \ll \Gamma(z)$. Last, the acoustic reflectivity is related to the local mechanical impedance $Z_s(z)$ of the surrounding medium:

$$r(z) = \frac{Z_s(z) - Z_f}{Z_s(z) + Z_f}. \quad (7)$$

In Equation (7) $Z_f$ is the mechanical impedance of the silica fiber. The spatial resolution of the analysis is $\frac{1}{2}v_g\tau$, with $v_g$ the group velocity of light in the fiber.

EXAMPLES

The invention will now be further illustrated through the following examples.

Measurement Setup

Figure 5:
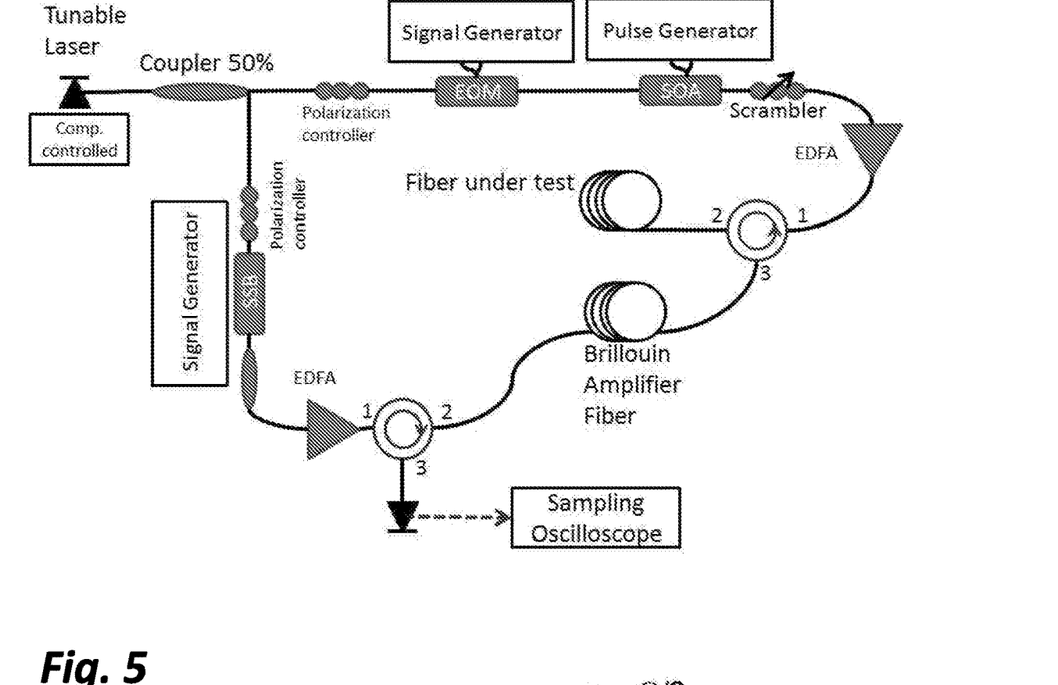
FIG. 5 is a schematic illustration of one embodiment of an experimental setup for the distributed fiber sensing based on guided acoustic waves Brillouin scattering. EOM: electro-optic modulator. SOA: semiconductor optical amplifier. EDFA: erbium-doped fiber amplifier. SSB: single-sideband electro-optic modulator.

One illustrative embodiment of the invention is shown in the schematic illustration of the experimental setup of FIG. 5.

Light from a tunable laser diode was split in two paths by a fiber-optic coupler. The optical frequency $\omega_0$ of the laser diode light was tuned between repetitions of the experiment, through computer control. Light in the upper branch was first modulated in an electro-optic amplitude modulator (EOM). The EOM was biased so that the carrier frequency $\omega_0$ is suppressed, and driven by a sine-wave at a radio-frequency $\frac{1}{2}\Omega$ from the output of a signal generator. Light at the modulator output therefore consisted of two tones at optical frequencies $\omega_0 \pm \frac{1}{2}\Omega$. Next, the amplitude of the two tones was modulated into pulses of duration $\tau$ in a semiconductor optical amplifier (SOA), which was driven by the output voltage of a pulse generator. The pulses were amplified in an erbium-doped fiber amplifier (EDFA), and launched into the fiber under test (FUT) through port 1 of a fiber-optic circulator. The power levels of the two spectral tones changed along the FUT due to GAWBS, as described above.

Rayleigh back-scatter from the incident pulse was directed through the circulator into a second section of fiber, which serves for narrowband stimulated Brillouin scattering amplification of one of the two tones at a time (see above). The Brillouin pump was drawn from the second branch of the coupler connected at the laser diode output. Light at that path went through a single-sideband electro-optic modulator (SSB), which was driven by a sine wave from the output of a second microwave signal generator. The sine wave was set to $\Omega_B \pm \frac{1}{2}\Omega$, where $\Omega_B$ is the Brillouin shift in the second fiber segment. Rayleigh back-scattered traces at optical frequencies of $\omega_0 \pm \frac{1}{2}\Omega$ were amplified, respectively. The amplified Rayleigh back-scatter traces were directed to a photo-detector through a second fiber-optic circulator, and sampled by a real-time digitizing oscilloscope. Sampled traces were digitally processed as described above.

Results

Figure 6:
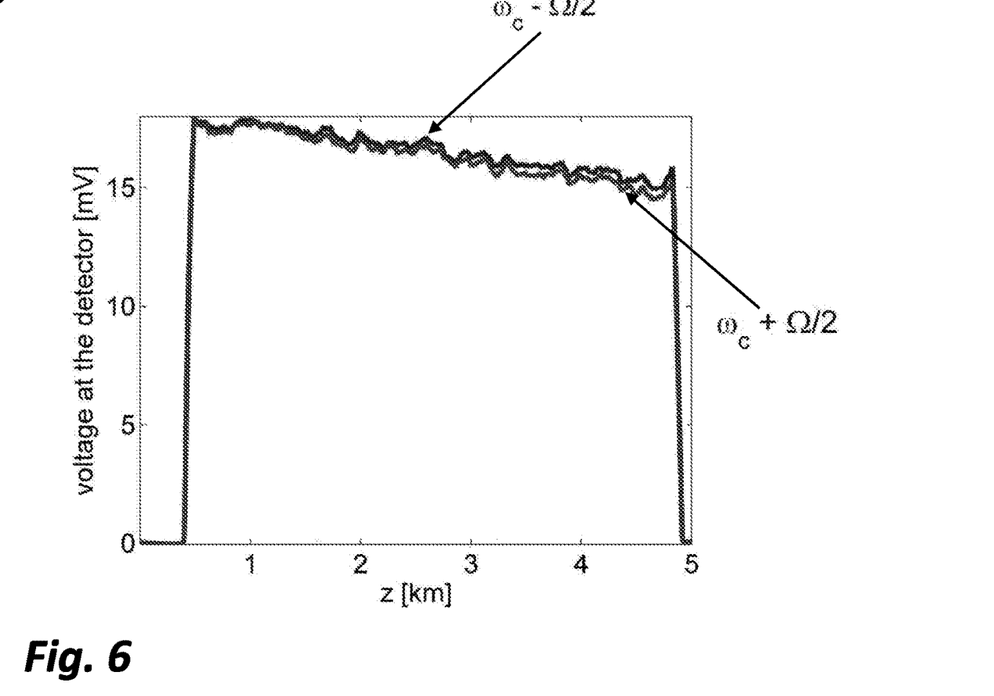
FIG. 6 shows detected waveforms of Rayleigh back-scatter as a function of position along a fiber under test, including (as indicated by the arrows) lower-frequency field components and higher-frequency field component. The difference between the frequencies of the two waves does not match the resonance frequency of a guided acoustic mode of the fiber.
Figure 7:
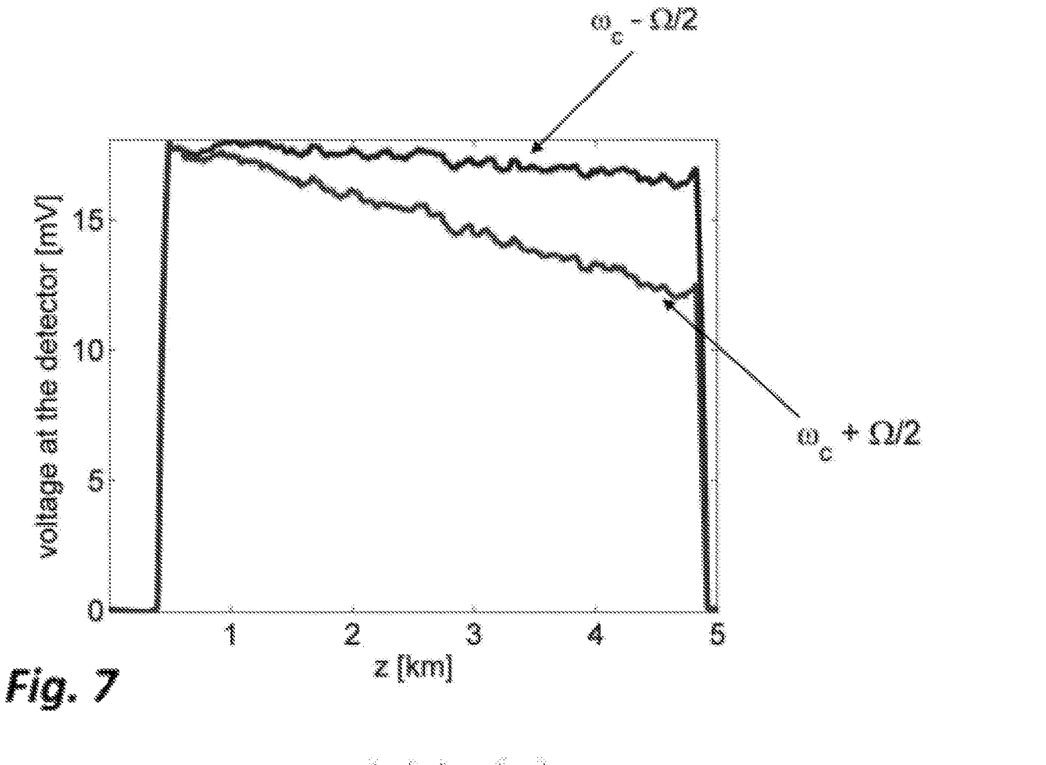
FIG. 7 shows detected waveforms of Rayleigh back-scatter as a function of position along a fiber under test, including (as indicated by the arrows) lower-frequency field components and high-frequency field component. The difference between the frequencies of the two waves matches the resonance frequency of a guided acoustic mode of the fiber.

FIG. 6 shows an example of a pair of traces $\langle P_{1,2}^{(R)} \rangle_\omega$, taken when the radio-frequency detuning $\Omega$ between the two field components was offset from the acoustic resonance $\Omega_0 = 321.4$ MHz of guided radial mode $R_{0,7}$ by several linewidths $\Gamma$. The two traces are nearly identical, indicating little exchange of power between the two field components, and $\gamma\%(z,\Omega) \approx 0$ for all z. FIG. 7 shows the same two traces with $\Omega \approx \Omega_0$. The attenuation of power along the fiber of the field component at frequency $\omega_0 - \frac{1}{2}\Omega$ is seen to be much smaller than that of field component at $\omega_0 + \frac{1}{2}\Omega$. The difference between the two measurements is due to the exchange of power between the two optical field components, which takes place through GAWBS at $\Omega_0$.

Figure 8:
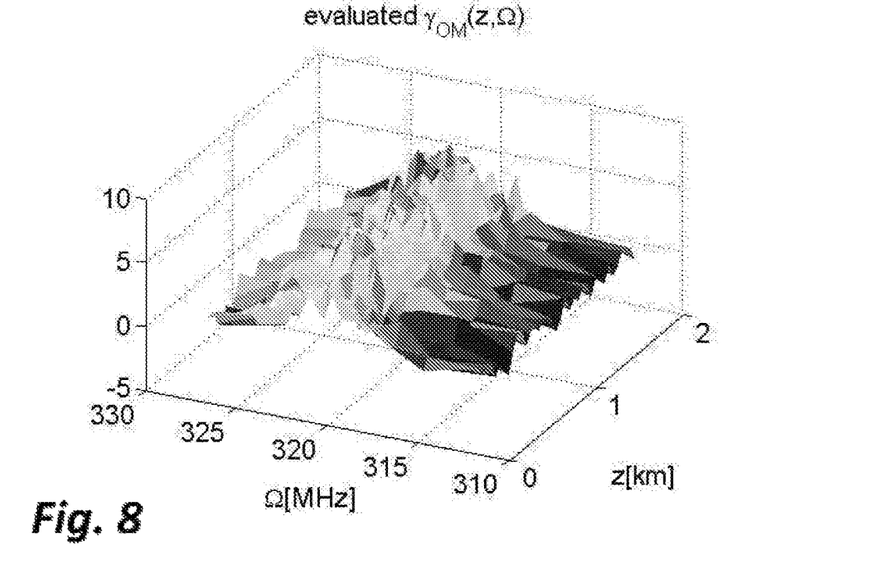
FIG. 8 shows a measured GAWBS coefficient as a function of position and frequency along 2 km of fiber under test; the spatial resolution is 50 m.
Figure 9:
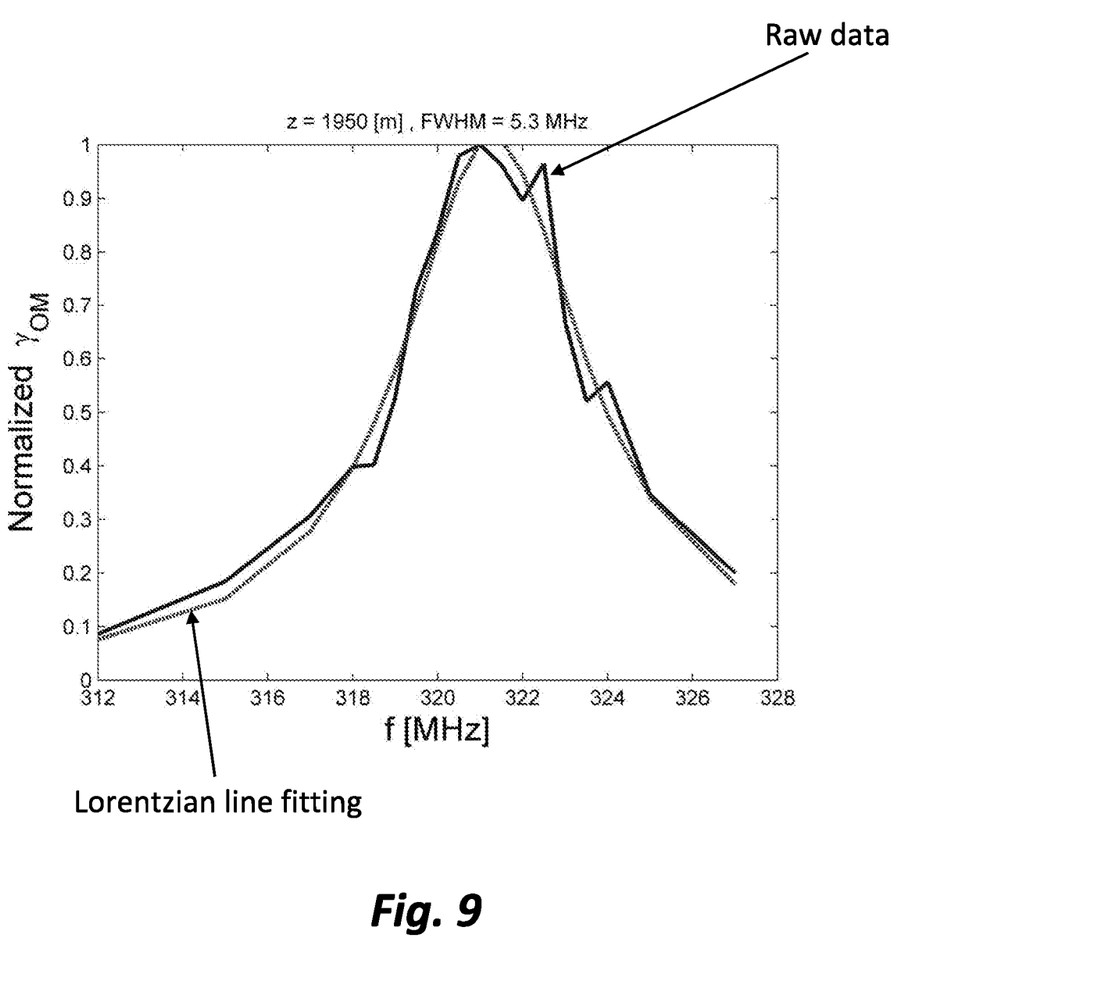
FIG. 9 is the measured GAWBS spectrum in a single 50 meters-long segment.

FIG. 8 shows a three-dimensional map of the retrieved GAWBS coefficient as a function of position and radio-frequency $\gamma\%(z,\Omega)$. The measurement range was 2 km and the spatial resolution was 50 m. Clear peaks at $\Omega_0$ are observed at all locations. An example of the measured GAWBS spectrum at a single location is shown in FIG. 9. A narrow-band resonant process is observed, according to expectations. The spectral full width at half maximum $\Gamma(z)$ could be estimated in each location. Values of $5.8 \pm 1$ MHz were measured, in agreement with previous measurements using setups that were not distributed.

All the above description has been provided for the purpose of illustration and is not meant to limit the invention in any way. As will be appreciated by the skilled person many modifications can be performed, and many different sensors can be provided, all without exceeding the scope of the invention.

The invention claimed is:

1. A method for sensing a parameter of an environment surrounding an optical fiber, comprising performing a distributed analysis of one or more guided acoustic wave Brillouin scattering (GAWBS) processes taking place therein by spatially mapping a spectral linewidth of a GAWBS coefficient along the optical fiber.

2. The method according to claim 1, wherein the one or more GAWBS processes involve the stimulation of one or more radial, torsional, or radial-torsional guided acoustic modes of the optical fiber.

3. The method according to claim 1, wherein the performing step includes spatially mapping a resonance frequency of a guided acoustic mode along the optical fiber.

4. The method according to claim 1, wherein a GAWBS process is used to estimate acoustic reflectivity at an outer boundary of the fiber cladding.

5. The method according to claim 1, wherein a GAWBS process is used to estimate acoustic reflectivity at an outer boundary of a layer or layers of coating surrounding the fiber cladding.

6. The method according to claim 1, wherein a GAWBS process is used to estimate mechanical impedance of media outside the fiber cladding.

7. The method according to claim 1, wherein a GAWBS process is used to estimate mechanical impedance of media outside a layer or layers of coating that are applied to the fiber cladding.

8. The method according to claim 1, wherein the sensed parameter is used to classify liquids under test.

9. The method according to claim 8, wherein the environment comprises a liquid that is selected from water, aqueous solutions, alcohols, and oils.

10. The method according to claim 1, wherein outer surfaces of the fiber cladding or of a coating surrounding the fiber cladding are modified to attach a chemical or biological reagent of interest, and whereby the attachment of said reagent is monitored through modifications to GAWBS processes.

11. The method according to claim 1, wherein the GAWBS distributed analysis is performed using an optical fiber selected from among standard single-mode, non-standard single-mode, few-mode, multi-core, multi-mode, photonic-crystal and micro-structured fibers.

12. The method according to claim 1, wherein GAWBS and backwards stimulated Brillouin scattering are used together.

13. The method according to claim 1, wherein two optical tones are used to stimulate guided acoustic waves in an optical fiber.

14. The method according to claim 13, wherein one of the following procedures is employed:
 (a) the two tones are launched from an input end of the optical fiber;
 (b) a first tone of the two tones is launched from an input end of the optical fiber, and a second tone is generated through the propagation of said first tone via spontaneous scattering from guided acoustic waves;
 (c) The an amplitude of the two tones is modulated by one or more, periodic or aperiodic pulses;
 (d) power levels of one tone or both tones change in propagation along the optical fiber due to GAWBS;
 (e) an optical power of one tone or both tones is spatially mapped along the optical fiber;
 (f) the optical power of one tone or both tones is spatially mapped based on measurements of Rayleigh back-scattering from the optical fiber;

(g) the optical power of one tone or both tones is spatially mapped based on measurements of point reflections;
(h) the optical power of each of one tone or both tones is spatially mapped based on measurements of reflections from a series of fiber Bragg gratings;
(i) the Rayleigh back-scattering contributions of the two tones are separately detected;
(j) the Rayleigh back-scattering contributions of the two tones are separated based on frequency-selective stimulated Brillouin scattering processes in the optical fiber;
(k) the Rayleigh back-scattering contributions of the two tones are separated through mixing with a local oscillator;
(l) the Rayleigh back-scattering contributions of the two tones are jointly processed following detection, using radio-frequency mixing, filtering and processing;
(m) the two tones stimulate guided acoustic waves, which are measured in turn through their interaction with a third optical wave that is launched from either end of the optical fiber.

15. The method according to claim 1, which is used to perform one of the following:

(j) monitoring and analysis of oil and gas wells;
(k) monitoring of pipeline integrity;
(l) monitoring of high-power electricity cables;
(m) structural health monitoring;
(n) oceanography;
(o) monitoring of water desalination processes;
(p) monitoring of chemical or petro-chemical industry processes;
(q) monitoring hazardous materials;
(r) monitoring of production processes in the food and beverage industry.

16. A sensor for sensing a parameter of an environment surrounding an optical fiber, comprising circuitry adapted to perform a distributed analysis of one or more guided acoustic wave Brillouin scattering (GAWBS) processes taking place in said optical fiber by spatially mapping a spectral linewidth of a GAWBS coefficient along the optical fiber.

17. The sensor according to claim 16, comprising circuitry adapted to stimulate and/or monitor one or more modes selected from radial, torsional, or radial-torsional guided acoustic modes of the optical fiber.

* * * * *